Oct. 31, 1939.　　　　　A. C. HELM　　　　　2,178,009
APPARATUS FOR PREPARING FOOD PELLETS
Filed March 4, 1938　　　5 Sheets-Sheet 1

Allison C. Helm
INVENTOR.
BY Cecil L. Hood
ATTORNEY.

Oct. 31, 1939.  A. C. HELM  2,178,009
APPARATUS FOR PREPARING FOOD PELLETS
Filed March 4, 1938  5 Sheets-Sheet 2
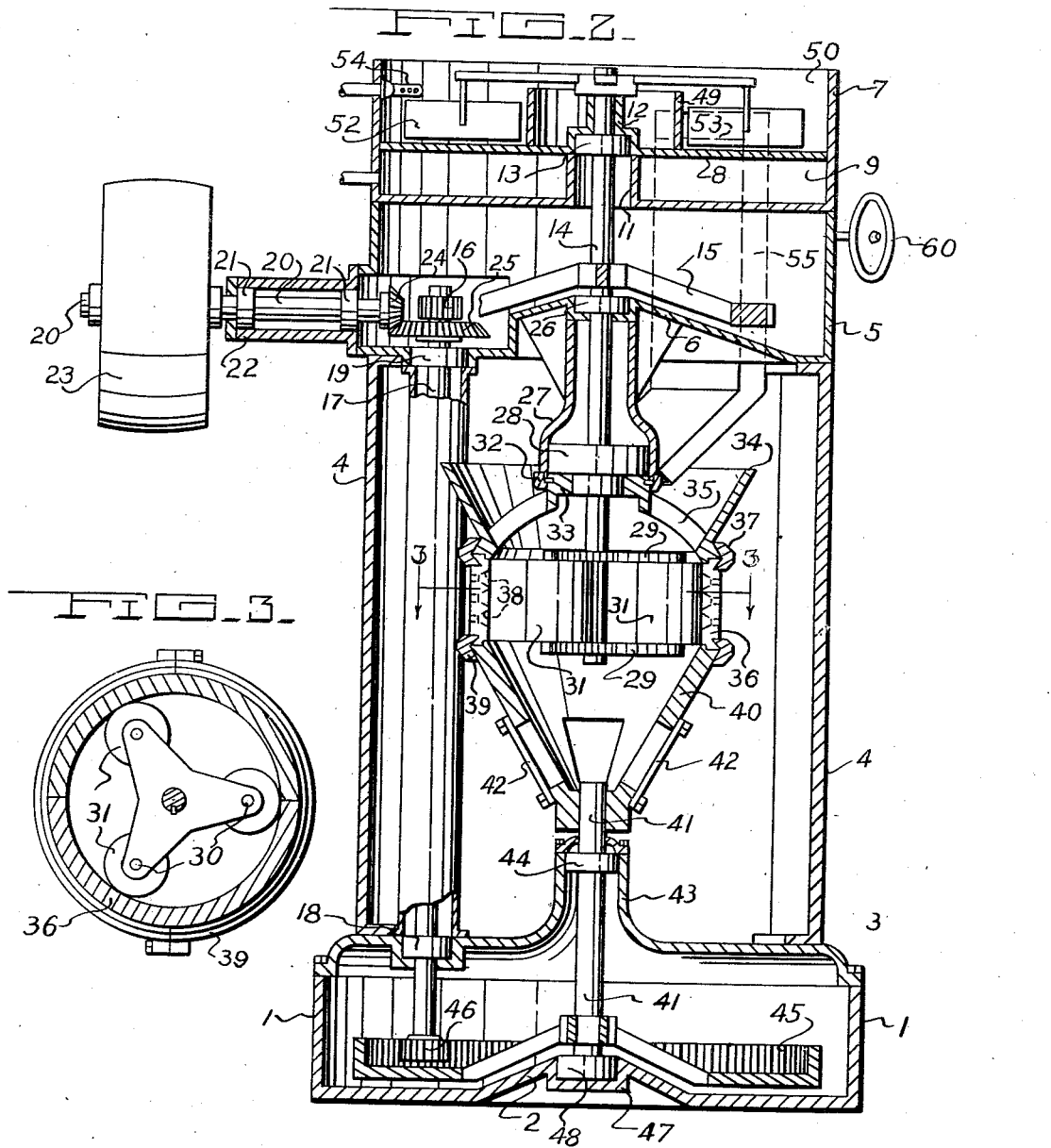
Allison C. Helm
INVENTOR.
BY Cecil L. Wood
ATTORNEY.

Oct. 31, 1939.   A. C. HELM   2,178,009
APPARATUS FOR PREPARING FOOD PELLETS
Filed March 4, 1938   5 Sheets-Sheet 3

Allison C. Helm
INVENTOR.
BY Cecil L. Wood
ATTORNEY.

Oct. 31, 1939.   A. C. HELM   2,178,009
APPARATUS FOR PREPARING FOOD PELLETS
Filed March 4, 1938   5 Sheets-Sheet 4
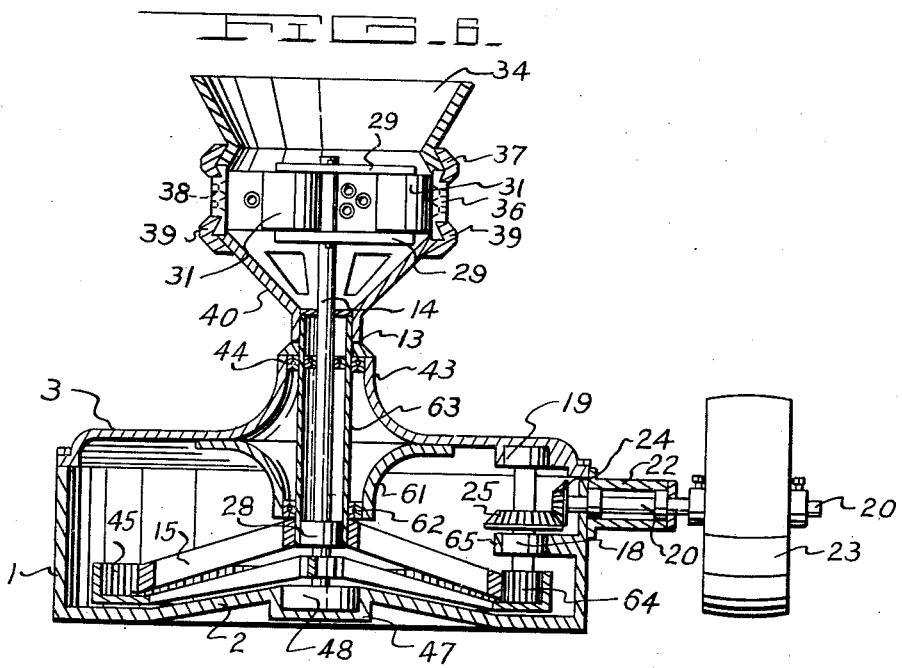
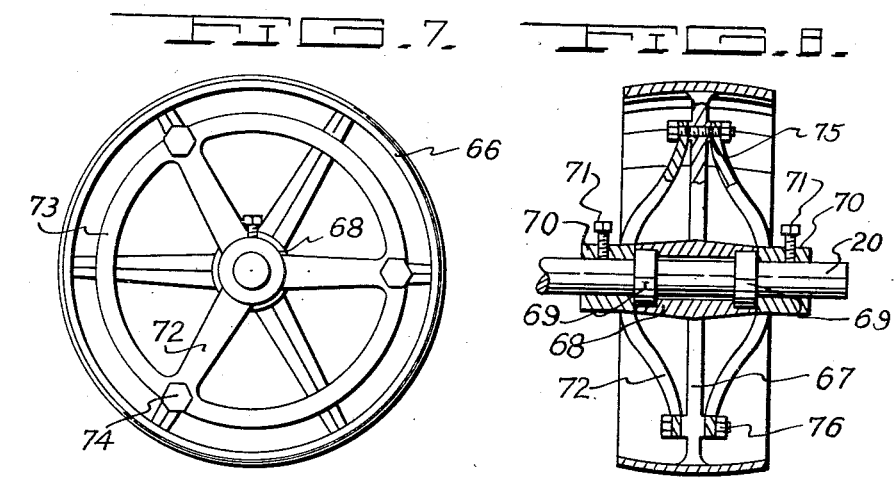
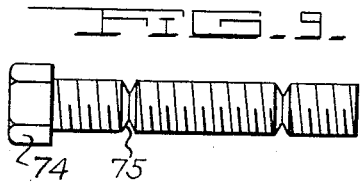
*Allison C. Helm*
INVENTOR.
BY *Cecil L. Hood*
ATTORNEY.

Oct. 31, 1939.    A. C. HELM    2,178,009
APPARATUS FOR PREPARING FOOD PELLETS
Filed March 4, 1938    5 Sheets-Sheet 5
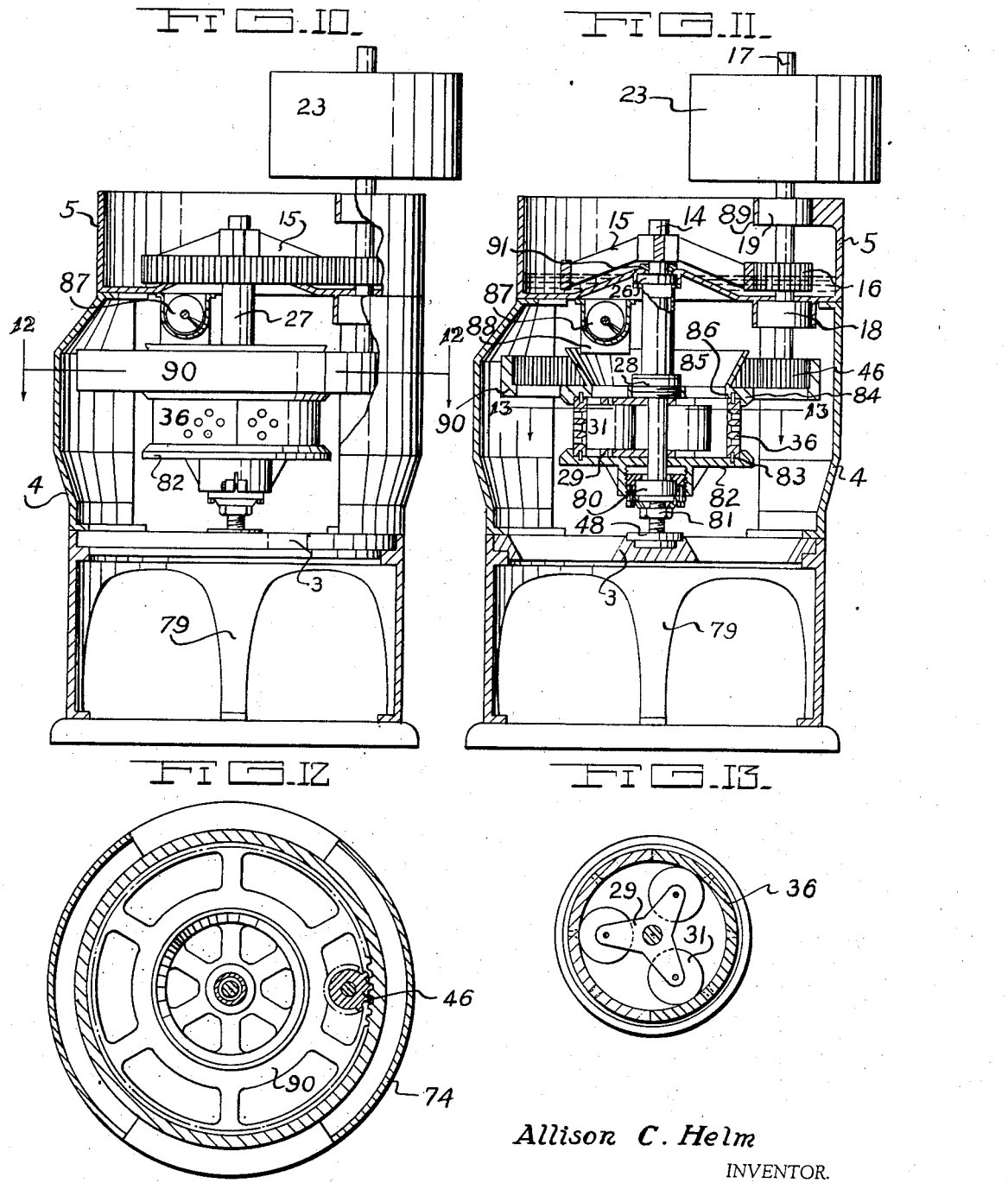
Allison C. Helm
INVENTOR.
BY Cecil L. Hood
ATTORNEY.

Patented Oct. 31, 1939

2,178,009

UNITED STATES PATENT OFFICE 2,178,009

APPARATUS FOR PREPARING FOOD PELLETS

Allison C. Helm, Fort Worth, Tex.

Application March 4, 1938, Serial No. 193,844

5 Claims. (Cl. 107—8)

This invention relates to apparatus for preparing foods for livestock, such as that comprised of cotton seed meal, or the like, and it has particular reference to a device suitably equipped to process the material in such a manner so as to provide pellets or cylindrical shaped particles of the same for convenient feeding and handling, and its principal object resides in the provision of a device affording a mechanism into which the product can be introduced in the form of meal or oil cakes and pressed through dies and formed into solid or semi-solid particles for feeding.

Another object of the invention resides in the provision of apparatus wherein is incorporated a novel arrangment of interchangeable dies, each having a multiplicity of varying sized apertures therethrough, and affording suitable means of pressing the said material through the said dies and shaping the same.

A further object of the invention is in the provision of a device of this character wherein the action of the machine on the material is positive and certain by reason of the vertical positions and the opposing turning action of the rollers and dies.

A still further object of the invention resides in the provision of a device of this character whereby a greater quantity of food stuff can be processed than in other machines for this purpose having the same relative dimensions.

Broadly, the invention seeks to comprehend the provision of a device capable of receiving and operating upon various types of stock foods, of a ground or semi-solid character, such as cotton seed meal, and shape the products to afford a desirable feeding commodity which can be more readily handled and apportioned.

While the foregoing objects are paramount other and lesser objects will become manifest as the description proceeds taken in connection with the appended drawings wherein:

Figure 2 is a vertical sectional view taken from the reverse side of Figure 1.

Figure 3 is a transverse sectional view of the dies and rollers taken on lines 3—3 of Figure 2.

Figure 6 is a vertical sectional view of a modified form of the invention.

Figure 7 is an elevational view of a drive pulley intended for use with the invention.

Figure 8 is a vertical sectional view of the pulley illustrated in Figure 7.

Figure 9 is an enlarged elevational view of a shearing bolt as used in the pulley illustrated in Figures 7 and 8.

Figure 10 is a vertical sectional view of another modification of the invention illustrating the dies and gears in elevation.

Figure 11 is the same as Figure 10 but illustrating the dies and some of the gears in section.

Figure 12 is a transverse sectional view taken on lines 12—12 of Figure 10, and

Figure 13 is a transverse sectional view taken on lines 13—13 of Figure 11.

Figure 1:
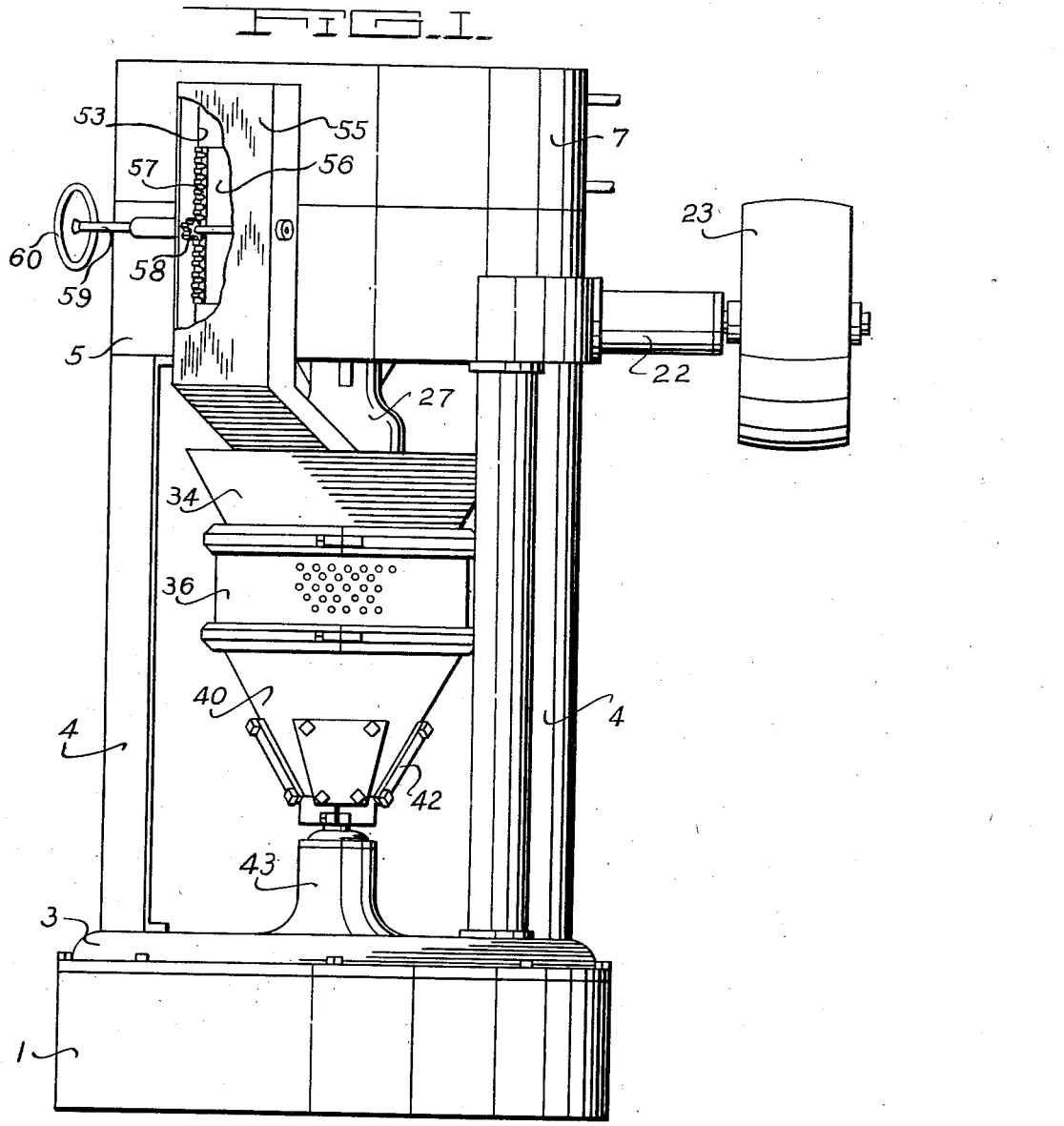
Figure 1 is an elevational view of the invention and illustrating the feeding mechanism by a fragmentary section.

It is not intended to limit the use of the herein described invention to the handling or processing of cotton seed meal products but instead to point out its usefulness in preparing related foods as well, and even mixed commodities, such as ground alfalfa, corn and sorghum, or any other usual livestock feed. Such commodities can be so processed as to provide a very convenient product for handling and feeding as well as producing a product of considerable value as food.

Accordingly, the invention in its preferred form consists of a cylindrical base 1, the bottom of which is formed substantially in the shape of a cone 2 at the center and forming an oil receptacle for the lubricating parts, as illustrated in Figure 2.

Bolted to the top of the top of the base 1 there is a bed plate 3, the purpose of which is to inclose the said base and to support the upper structure by means of a frame 4 mounted on the said bed plate. The frame 4 is constructed in two sections, each being nearly semi-circular and thereby forming an opening therebetween and allowing access to the internal parts.

Superimposed on this frame there is a container 5 constructed in such a manner as to form a receptacle for oil and to serve as a housing for certain of the working parts, and like the base, the central portion of the bottom extends upward and likewise provides a receptacle for lubricating oil.

Immediately above the container 5 there is mounted a receptacle 7, that has a false bottom 8, forming a chamber 9 into which steam is introduced by the pipe 10. Integral with the bottom of the receptacle there is a vertically arranged cylinder 11 the upper end meeting the false bottom 8, which likewise has a vertically arranged cylinder 12 that engages a bearing 13 of the vertical axle 14.

On the axle 14, within the container 5, there is secured a large external gear 15 that is designed to operate immediately above the inverted cone 6 and engages a pinion gear 16 secured to the uppermost end of the vertical shaft 17, the said shaft being vertically arranged near the frame 4 and extending downwardly into the base 1 and having a bearing 18 supported in the bed plate 3 at its lower end and likewise supported at its upper end by another bearing 19 mounted within the bottom of the said container.

Figure 4:
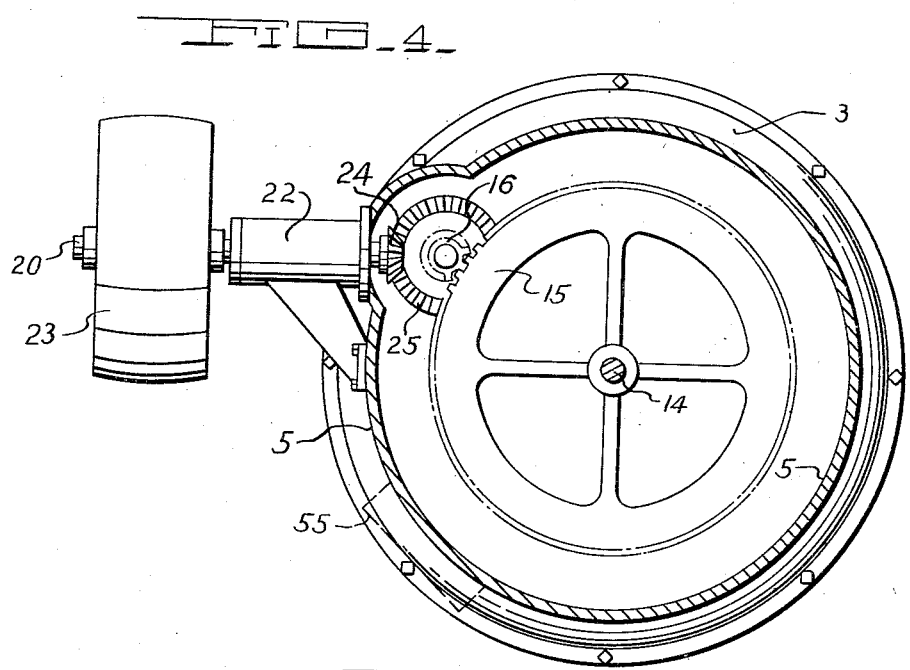
Figure 4 is a tranverse sectional view taken on lines 4—4 of Figure 2.
Figure 5:
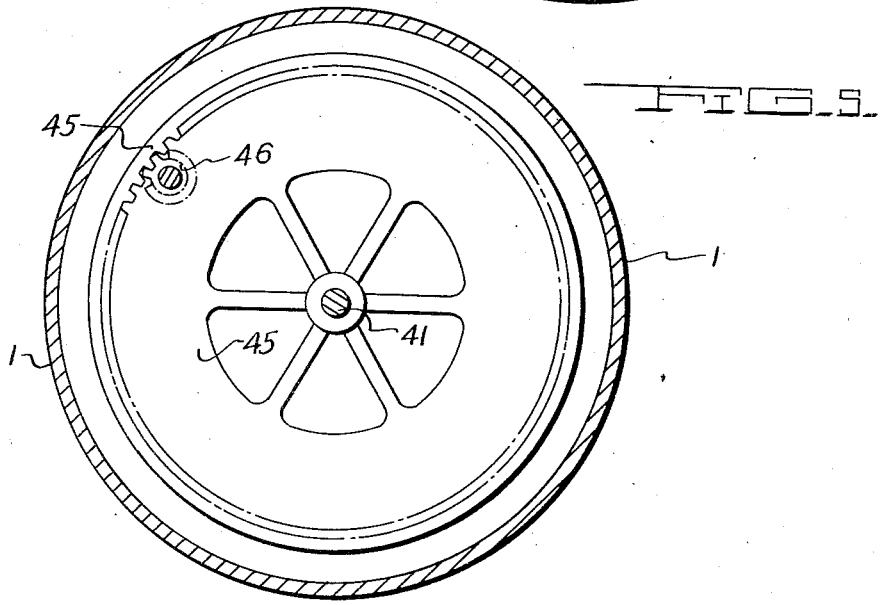
Figure 5 is a transverse sectional view taken on lines 5—5 of Figure 2.

A horizontal drive shaft 20 is mounted on the side of the container 5 and supported in place by bearings 21 within the housing 22 that engages the outer wall of the said container as illustrated in Figures 1, 2, and 4. In order that the housing 22 might have the necessary strength, the axial center thereof is directed other than to the vertical axial center of the device.

A drive pulley 23 engages the shaft 20 and in turn rotates a beveled pinion gear 24 that meshes with a larger driven beveled gear 25 secured to the vertical shaft 17 within container 5.

The previously referred to vertical axle 14 extends downwardly below the bearing 13 and is engaged by another bearing 26, thence downwardly through a bell housing 27 and a relatively large bearing 28 and supports near its lowermost end a pair of spaced spiders 29, the arms of which provide engagement for the vertical axles 30 of rollers 31 for rotation about the said shaft.

At its lowermost end the bell housing 27 is recessed in its lower outer periphery for engagement with a band 32 that frangibly engages the hub 33 on a hopper 34, the said hub and the said hopper being joined by spokes 35, as particularly illustrated in Figure 2. The lower edge of the hopper 34 is flanged on its outer periphery and is recessed in its under edge for the purpose of securing the dies 36 in place since the said lower edge and the said dies are engaged by the tension bands 37. The dies 36 are provided with constricted or funnel shaped apertures 38 for engaging and acting upon the food stuff as it is pressed by the rollers 31.

Similar bands 39 engage the lower edge of the dies 36 and also engage the upper edge of a funnel shaped compartment 40 that is supported and securely fixed to the upper end of a vertical axle 41. Openings are provided in the funnel shaped compartment for removing unprocessed food stuff the necessity of which will be seen in the description of the operation, and are covered with small plates, or doors 42, bolted to the said compartment when the machine is in operation.

An integral cylindrical projection 43 is provided at the center of the bed plate 3 for supporting a bearing 44 that engages the vertical axle 41. Below the bearing 43 and above the cone 2 of the base 1 there is provided a relatively large internal gear 45 that is driven by a pinion gear 46, the last named gear being secured to the lowermost end of the vertical shaft 17. Within the apex of the cone 2 there is provided a housing 47, the purpose of which is to support a thrust bearing 48 which in turn supports the vertical axle 40 previously described.

Within the receptacle 7 there is arranged about its vertical axis a cylinder 49, forming a circular channel 50 within the receptacle wall into which the food stuffs to be processed are first introduced. At the upper end of the vertical axle 14 lateral arms 51 are secured for operating horizontally arranged agitators 52 whose function is to mix the food stuff and force push the same through an opening 53 in the wall of the receptacle 7 after having been moistened by hot water supplied by the nozzle 54.

With particular reference to Figure 1, a chute 55 is provided over the opening 53 and extends downwardly until the said chute is diverted to within the upper portion of the hopper 34. A gate 56 is provided in the chute 55 for opening and closing the opening 53 and is operated by means of a gear rack 57 on the said gate and by a pinion gear 58 cooperating therewith, the said pinion gear being mounted on a horizontal shaft 59 that is turned by a hand wheel 60.

In operation food stuff is introduced into the receptacle 7 where it is thoroughly mixed and partially cooked with the hot water and by the steam in the chamber 9. As soon as the channel 50 has been filled the food stuff is pressed through the opening 53 and into the chute 55 whence it falls by force of gravity into the hopper 34 and downwardly through the spiders 29 and between the rollers 31, where it is then acted upon by the rotation of the dies 36 in one direction and the rollers in another direction by reason of the gear arrangement previously described. The vertical position of the said rollers and dies cause the excess food stuff within the said dies to be stirred and mixed and the resulting piling thus prepares a mass that is more readily acted on. Thence the food is forced through the constricted apertures 38 and falls by its own weight from the said apertures forming pressed pellets. Vertical scraping knives may be arranged near the outer surface of the dies 36 for cutting the pellets into uniform lengths, but such knives are not necessary, although, according to requirements, they may be desirable.

A modification of the invention is illustrated in Figure 6 and is intended to provide a machine of this character that is light in construction as compared with the relative sizes of the dies and rollers. The base 1 is provided having a cone shaped bottom 2 the top of which forms a housing 47 for supporting a thrust bearing 48. A bed plate 3 is bolted to the top of the base 1 and has an integral cylindrical projection 43 which in turn supports a bearing 44.

The thrust bearing 48 supports the roller supporting shaft 14, as well as the internal gear 45 and extends upwardly through the bearing 28 and the bearing 13 and has near its top the rigidly secured spiders 29 that support the rollers 31 in the manner as previously described. Below the integral cylindrical projection 43 there is another cylinder 61 extending downwardly from the bed plate 3 and contains in its lower end a bearing 62 that serves as a guide for a torque tube 63, the upper end of which engages the lower end of the funnel shaped compartment 40, which in turn supports the dies 36 and the hopper 34 in the manner previously described, these last named parts being secured by tension bands 37 and 39.

To the lower end of the torque tube 63 there is secured an external gear 15, the teeth of which operate within the teeth of the internal gear 45, both sets of gears being engaged by the pinion gear 64 and, since one set of gears is internal and the other external, the said gears are turned in opposite directions.

The pinion gear 64 is positioned on the lowermost end of the shaft 17 and, similar to the previously described structure, is retained in place by the bearings 18 and 19, the last named gear being housed in an integral housing 65, of the base 1. The shaft 17 is rotated by means of the beveled gear 25 that is driven by the driving pinion gear 24 mounted on the end of the horizontal shaft 20, the last named shaft being retained in place by a horizontal housing 22 and the bearings 21.

The modification as illustrated in Figure 6 is provided with a novel driving pulley 66 that may be adapted to any of the forms of the invention, the purpose of which is to provide a means whereby the parts of the machine are not damaged when hard foreign substances are introduced into the die and roller arrangement. With particular reference to Figures 7, 8, and 9, the pulley 66 is provided with spokes 67 that have a hub 68 slightly larger than the shaft 20 and contains bearings 69 for suspending the said hub and providing free rotation on the said shaft. On either side of the hub 68 there are provided outer hubs 70 that are rigidly secured to the shaft 20 by the keys 71, the last named hubs having integral arms 72 and integral rings 73 at the end thereof so arranged as to contact the spokes 67 within the periphery of the pulley 66, particularly illustrated in Figure 8. Through the rings 73 and the spokes 67 there are provided shearing bolts 74 having recesses 75 on their shafts at distances so as to coincide with the contact points between the said rings and the said spokes and are secured in place by the nuts 76.

Thus it can be seen that if a hard particle should become lodged between any of the working parts of the machine, the weakest point in the train of power will be at the recesses 75 and shear the bolt 74. Consequently the driven pulley 66 will rotate on its bearings 69, and since the rings are secured in their positions by the keys 71 in the outer hubs 68, the pulley is retained in place to rotate while the device is not operating, thus preventing any serious damage to the machine.

Another modification of the invention is illustrated in Figures 10, 11, 12, and 13, wherein a device of this character is supported on a pedestal 79 which in turn supports a bed plate 3 and a semi-circular housing 4 that is substantially the same as described in the preferred form of the invention. Superimposed on the housing 4 there is a container 5 having a conical bottom 6 the purpose of which is to provide an outer channel for a level of oil for the lubrication of an external gear 15 that is mounted on a vertical shaft 14. The shaft 14 extends downwardly through a bearing 26 and a housing 27, through a bearing 28 below which it secures the spaced spiders 29 that vertically suspend the rollers 31, thence downwardly through a thrust bearing 80 and a retaining nut 81 to a thrust bearing 48 that is positioned in the center of the bed plate 3. The nut 81 supports a flanged disc 82 that in turn receives the two semi-circular dies 36, the said flange retaining the said dies against outward pressure of the rollers 31. Pins 83 are provided to prevent slipping between these last named parts and are illustrated in Figure 11. Immediately above the dies 36 another flanged disc 84 retains the upper edges of the said dies also having pins 83 securing these parts. Cast integral with the disc 84 there is provided a hopper 85 for the introduction of food stuff between the rollers 31 and the inner surfaces of the dies 36, openings 86 being provided through the upper disc 84.

Food stuffs, such as cotton seed meal is conveyed to the apparatus by means of a screw conveyer 87 that is attached to the lower portion of the container 5. When the said screw conveyer passes over the hopper 85, downwardly projecting opening 88 allows meal to attain a level no higher than the bottom of the said opening. Thus if the hopper becomes too full, excess food stuff is carried off by the conveyer.

Cast integrally to one side of the container 5 there is a housing 89 that supports a bearing 19 for the vertical drive shaft 17, the said drive shaft being rotated by the pulley 23 for turning the pinion gear 16 that drives the external gear 15 and the rollers 31.

Immediately below the container 5 and around the shaft 17 there is positioned another bearing 18 the function of which is to support the said shaft. At the lowermost end of the shaft 17 there is secured a pinion gear 46 that drives a relatively large internal gear 90 which is integral with the upper flange disc 84 for rotation of the dies 36 through the pins 83.

Immediately below the gear 15 and above the bearing 16 a packing gland 91 is provided to prevent excess oil from passing through the lower portions of the device.

Manifestly, the structure shown is capable of considerable changes and modifications from time to time by those versed in the art, and such modifications as may be considered within the spirit and intent of the invention may also be considered as falling within the scope of the appended claims.

What is claimed is:

1. In a machine for preparing pellets for livestock, the combination of a base, a bed plate above the said base and supporting a housing, a compartment above the said housing for inclosing gears and for retaining a quantity of lubricating oil, a vertical axle supported on the said base, the said axle supporting interchangeable dies, another vertical axle arranged above and through the said dies, agitators positioned near the upper end of the last named axle, a drive shaft vertically arranged through the device, an internal gear disposed on the first named axle and driven by means cooperating with the said drive shaft, the said drive shaft being provided with driving means, means positioned near the upper end of the said drive shaft, an external gear positioned on the second named vertical axle and cooperating with the last named means.

2. In a machine for preparing pellets for livestock, the combination of a base, a bed plate above the said base and supporting a housing, a compartment above the said housing for inclosing gears and for retaining a quantity of lubricating oil, a vertical axle supported on the said base, segmented dies supported by the said axle, tension bands around the upper and lower peripheries of the said dies, apertures arranged within the walls of the said dies, the said apertures having larger diameters at their inner ends than at their outer ends, a hopper positioned above and opening into the said dies and retained in position by the said upper tension band, another vertical axle arranged above and through the said dies, agitators positioned near the upper end of the last named axle, a drive shaft vertically arranged through the device, an internal gear disposed on the first named axle and driven by means cooperating with the said drive shaft, the said drive shaft being provided with driving means, means positioned near the upper end of the said drive shaft, an external gear positioned on the second named vertical axle and cooperating with the last named means.

3. In combination with a machine for preparing pellets for live stock, segmented dies forming a circular die, a hopper above and opening into the said die, means encircling the upper periphery of the said die and securing the said hopper thereto, apertures through the walls of the said segments, a support for the said die and the said hopper means encircling the lower periphery of the said die and securing the same to the support, a plurality of rollers within the said die and cooperating therewith, means rotating the die in one direction and means rotating the rollers in the opposite direction.

4. In combination with a machine for preparing pellets for live stock, a pair of semicircular members forming an interchangeable circular apertured die having vertical walls, a receptacle formed by the said die, a hopper above and communicating with the said receptacle, a support for the said die and the said hopper, means comprising a band encircling the upper rim of the said die and the lower rim of the said hopper connecting the said members, means securing the said die to the said support, a multiple of rollers operatively arranged within the said receptacle and cooperating with the walls thereof and means rotating the said rollers and the said die in opposite directions.

5. In combination with a machine for preparing pellets for live stock, segmented members forming a circular die having a support, a hopper arranged above and opening into the said die, means comprising tension bands arranged about the upper and lower peripheries of the said die connecting the said hopper to the upper rim of the said die and securing the said die to its support, a plurality of rollers arranged within the said die for cooperation therewith and means rotating the said die in one direction and means rotating the said rollers in the opposite direction.

ALLISON C. HELM.